(12) United States Patent
Chung et al.

(10) Patent No.: US 11,486,469 B2
(45) Date of Patent: Nov. 1, 2022

(54) CYCLOID SPEED REDUCER

(71) Applicant: Delta Electronics, Inc., Taoyuan (TW)

(72) Inventors: Chi-Wen Chung, Taoyuan (TW); Hung-Wei Lin, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 0 days.

(21) Appl. No.: 17/389,115

(22) Filed: Jul. 29, 2021

(65) Prior Publication Data

US 2022/0136587 A1    May 5, 2022

Related U.S. Application Data

(60) Provisional application No. 63/110,146, filed on Nov. 5, 2020.

(30) Foreign Application Priority Data

Apr. 27, 2021   (CN) .......................... 202110459915.9

(51) Int. Cl.
*F16H 1/32*      (2006.01)
*F16H 57/08*   (2006.01)

(52) U.S. Cl.
CPC ................ *F16H 1/32* (2013.01); *F16H 57/08* (2013.01); *F16H 2001/323* (2013.01); *F16H 2001/327* (2013.01)

(58) Field of Classification Search
CPC ...... F16H 1/32; F16H 57/08; F16H 2001/323; F16H 2001/327
See application file for complete search history.

(56) References Cited

U.S. PATENT DOCUMENTS 9,005,065 B2 * 4/2015 Huang ...................... F16H 1/32
                                                                          475/168
2019/0264780 A1   8/2019 Tamura et al.

FOREIGN PATENT DOCUMENTS

| CN | 201412480 Y   | * | 2/2010  | ............... F16H 1/32 |
| CN | 103527719 A   | * | 1/2014  | |
| CN | 106594188 A   | * | 4/2017  | |
| CN | 206458806 U   |   | 9/2017  | |
| CN | 111895045 A   |   | 11/2020 | |
| DE | 102015226488 A1 | * | 6/2016 | ............... F16H 1/32 |
| DE | 102017126737 A1 | * | 5/2019 | ............... F16H 1/32 |
| TW | I675976 B     |   | 11/2019 | |
| TW | 202030427 A   |   | 8/2020  | |

(Continued)

*Primary Examiner* — Sherry L Estremsky
(74) *Attorney, Agent, or Firm* — Kirton McConkie; Evan R. Witt

(57) ABSTRACT

A cycloid speed reducer includes an input shaft, a rolling assembly, a first cycloid disc, a second cycloid disc, a first crankshaft, a second crankshaft, a first output disc and a second output disc. The first cycloid disc and the second cycloid disc are disposed around the input shaft and rotated with the input shaft. The first cycloid disc and the second cycloid disc are located at two opposite sides of the rolling assembly, respectively. The first crankshaft includes a first concentric end and a first eccentric end. The first eccentric end is linked with the first cycloid disc. The second crankshaft includes a second concentric end and a second eccentric end. The second eccentric end is linked with the second cycloid disc. The first output disc is linked with the first concentric end. The second output disc is linked with the second concentric end.

10 Claims, 11 Drawing Sheets

(56) References Cited

FOREIGN PATENT DOCUMENTS

TW 202102788 A 1/2021
TW 202113250 A 4/2021

* cited by examiner

CYCLOID SPEED REDUCER

CROSS-REFERENCE TO RELATED APPLICATION

This application claims the benefit of U.S. Provisional Application No. 63/110,146 filed on Nov. 5, 2020, and entitled "CYCLOID SPEED REDUCER". This application also claims priority to China Patent Application No. 202110459915.9 filed on Apr. 27, 2021. The entire contents of the above-mentioned patent applications are incorporated herein by reference for all purposes.

FIELD OF THE INVENTION

The present invention relates to a speed reducer, and more particularly to a cycloid speed reducer.

BACKGROUND OF THE INVENTION

Generally, a motor is operated at a high speed and a low torque. In other words, it is difficult to use the motor to drive a large-sized load. For allowing the motor to drive a heavy object, a speed reducer is used for reducing the rotating speed of the motor and increasing the torque.

Conventionally, the speed reducers are classified into several types, including rotary vector (RV) reducers, harmonic drive reducers and cycloid speed reducers. Since the conventional cycloid speed reducer has many benefits such as large transmission ratio, compact structure and high transmission efficiency, the cycloid speed reducer has been commonly used in various fields related to motors.

Please refer to FIGS. 1, 2 and 3. FIG. 1 is a schematic cross-sectional view illustrating the structure of a conventional cycloid speed reducer. FIG. 2 is a schematic functional block diagram illustrating a power transmission mechanism in the conventional cycloid speed reducer as shown in FIG. 1. FIG. 3 is a schematic cross-sectional view showing a portion of the crankshaft in the conventional cycloid speed reducer as shown in FIG. 1. As shown in FIGS. 1, 2 and 3, the conventional cycloid speed reducer 1 includes an input shaft 11, a spur gear 12, a crankshaft 13 (also referred as an eccentric shaft), two cycloid discs 14 and an output disc 15. Since the conventional cycloid speed reducer 1 includes two cycloid discs 14, the power output is evened, and the dynamic balance is enhanced.

Moreover, since the crankshaft 13 corresponds to the two cycloid discs 14, the crankshaft 13 has a dual eccentric structure. For example, the crankshaft 13 includes a first concentric end 131, a second concentric end 132, a first eccentric end 133 and a second eccentric end 134, which are integrally formed as a one-piece structure. Since the first concentric end 131, the second concentric end 132, the first eccentric end 133 and the second eccentric end 134 are integrally formed as the one-piece structure, these components are directly linked with each other. The first concentric end 131 and the second concentric end 132 are located at two opposite outer sides of the crankshaft 13, respectively. In addition, the first concentric end 131 and the second concentric end 132 are coaxial with the crankshaft 13. The first eccentric end 133 and the second eccentric end 134 are eccentrically disposed on the crankshaft 13. Consequently, the first eccentric end 133 and the second eccentric end 134 are eccentric relative to the first concentric end 131 and the second concentric end 132. In this way, the dual eccentric structure is formed. Moreover, the first eccentric end 133 and the second eccentric end 134 are arranged between the first concentric end 131 and the second concentric end 132. When the crankshaft 13 is rotated, the first eccentric end 133 and the second eccentric end 134 are driven by the crankshaft 13 and eccentrically rotated relative to the axis of the crankshaft 13. In addition, the first eccentric end 133 and the second eccentric end 134 further drive the respective rotations of the two cycloid discs 14.

Moreover, the diameter $\Phi A$ of the first concentric end 131 and the diameter $\Phi B$ of the second concentric end 132 are equal, and the diameter DC of the first eccentric end 133 and the diameter $\Phi D$ of the second eccentric end 134 are equal. For complying with the requirements of the bearing assembly process, the diameter $\Phi C$ of the first eccentric end 133 needs to be greater than the diameter $\Phi A$ of the first concentric end 131 and the diameter $\Phi D$ of the second eccentric end 134 needs to be greater than the diameter $\Phi B$ of the second concentric end 132.

The power transmission method of the conventional cycloid speed reducer 1 will be described as follows. Firstly, the input shaft 11 drives the rotation of the spur gear 12. Then, the spur gear 12 drives the rotation of the crankshaft 13. Consequently, the first eccentric end 133 and the second eccentric end 134 of the crankshaft 13 drive the respective rotations of the two cycloid discs 14. By contacting the two cycloid discs 14 with rolling pins of the output disc 15, the two cycloid discs 14 drives the rotation of the output disc 15. In such way, the power transmission purpose is achieved.

Due to the arrangement of the two cycloid discs 14 and the use of the above power transmission method, the conventional cycloid speed reducer 1 has to use a single crankshaft 13 that has the dual eccentric structure with the first eccentric end 133 and the second eccentric end 134. However, the crankshaft 13 having the dual eccentric structure still has some drawbacks.

Firstly, the first concentric end 131, the second concentric end 132, the first eccentric end 133 and the second eccentric end 134 of the crankshaft 13 need to cooperate with respective bearings. For complying the requirements of the bearing assembly process, the external diameters of the first eccentric end 133 and the second eccentric end 134 between the first concentric end 131 and the second concentric end 132 need to be greater than the external diameters of the first concentric end 131 and the second concentric end 132. The limitations of the external diameters of the first eccentric end 133 and the second eccentric end 134 are detrimental to the miniaturization of the conventional cycloid speed reducer 1. Moreover, the external diameters of the first concentric end 131 and the second concentric end 132 are respectively different from the external diameters of the first eccentric end 133 and the second eccentric end 134. Consequently, the bearing sizes matching the first eccentric end 133 and the second eccentric end 134 and the bearing sizes matching the first concentric end 131 and the second concentric end 132 are different. Since the sizes of the bearing are different, it is unable to use the same bearing material. Furthermore, the first eccentric end 133 and the second eccentric end 134 that are integrally formed on the single crankshaft 13 not only require the amount of eccentricity but also require the accuracy of the phase angle difference. For meeting the above-mentioned requirements, the processing complexity of the crankshaft 13 of the conventional cycloid speed reducer 1 is increased. Consequently, the fabricating cost is increased.

Therefore, there is a need of providing an improved cycloid speed reducer in order to the overcome the drawbacks of the conventional technologies.

SUMMARY OF THE INVENTION

An object of the present invention provides a cycloid speed reducer to address the issues encountered by the traditional cycloid speed reducer such as not conducive to miniaturization, inability to share bearings and high fabricating costs. The structure of the present cycloid speed reducer is specially designed. Consequently, the miniaturization of the cycloid speed reducer is achieved, and the component cost and the fabricating cost are reduced.

In accordance with an aspect of the present invention, a cycloid speed reducer is provided. The cycloid speed reducer includes an input shaft, a rolling assembly, a first cycloid disc, a second cycloid disc, at least one first crankshaft, at least one second crankshaft, a first output disc and a second output disc. The input shaft is rotatable. The rolling assembly includes a ring-shaped structure and a plurality of rolling pins. The plurality of rolling pins are disposed on the ring-shaped structure. The first cycloid disc is disposed around the input shaft. The first cycloid disc is rotated with the input shaft. The first cycloid disc includes at least one first tooth part. The at least one first tooth part is contacted with the corresponding rolling pin. The second cycloid disc is disposed around the input shaft. The second cycloid disc is rotated with the input shaft. The second cycloid disc includes at least one second tooth part. The at least one second tooth part is contacted with the corresponding rolling pin. The first cycloid disc and the second cycloid disc are located at two opposite sides of the rolling assembly, respectively. Each first crankshaft includes a first concentric end and a first eccentric end. The first concentric end and the first eccentric end are eccentric relative to each other. The first eccentric end is linked with the first cycloid disc. Each second crankshaft includes a second concentric end and a second eccentric end. The second concentric end and the second eccentric end are eccentric relative to each other. The second eccentric end is linked with the second cycloid disc. The first output disc is linked with the first concentric end of the first crankshaft. The second output disc is linked with the second concentric end of the second crankshaft. The first output disc and the second output disc are respectively located at two opposite outer sides of the cycloid speed reducer. At least one of the first output disc and the second output disc is a power output end of the cycloid speed reducer.

The above contents of the present invention will become more readily apparent to those ordinarily skilled in the art after reviewing the following detailed description and accompanying drawings, in which:

DETAILED DESCRIPTION OF THE PREFERRED EMBODIMENT

The present invention will now be described more specifically with reference to the following embodiments. It is to be noted that the following descriptions of preferred embodiments of this invention are presented herein for purpose of illustration and description only. It is not intended to be exhaustive or to be limited to the precise form disclosed.

Figure 1:
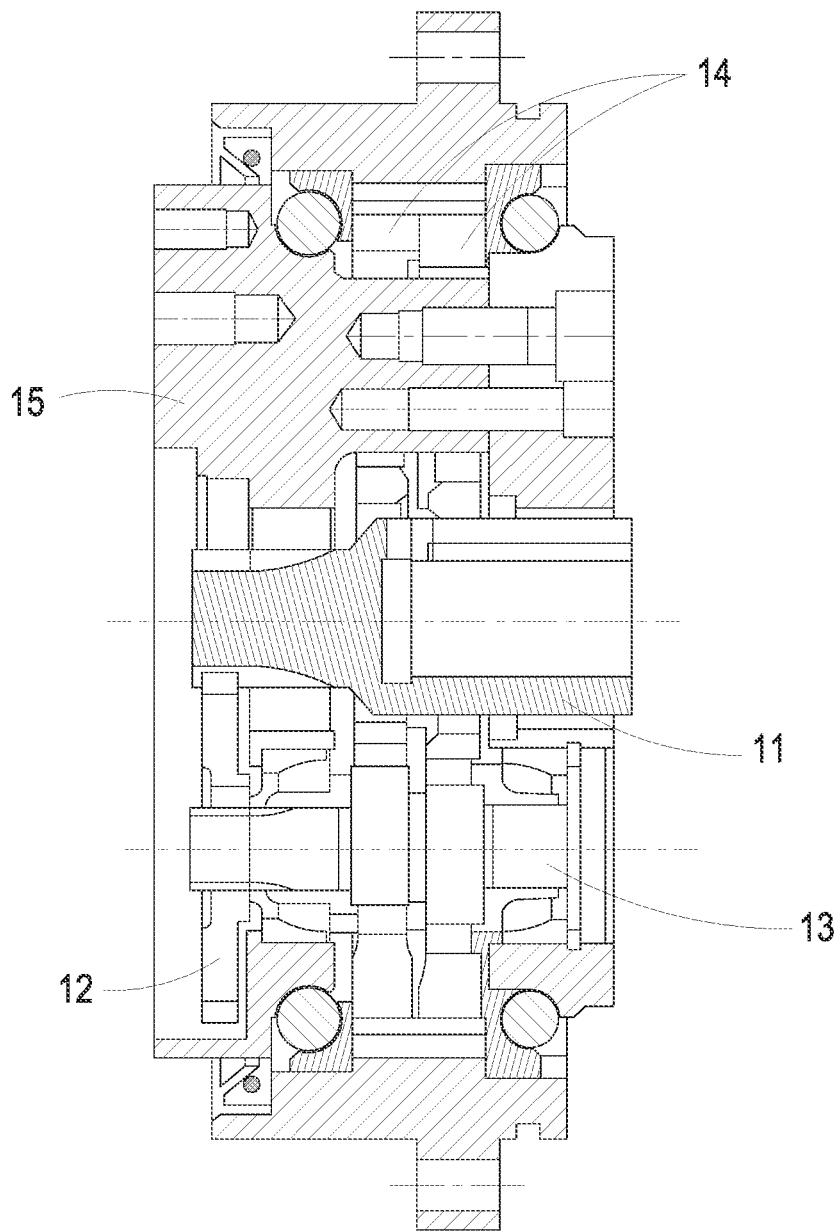
FIG. 1 is a schematic cross-sectional view illustrating the structure of a conventional cycloid speed reducer.
Figure 2:
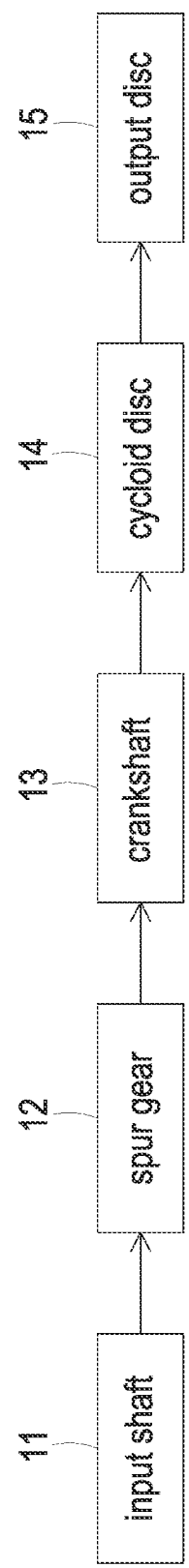
FIG. 2 is a schematic functional block diagram illustrating a power transmission mechanism in the conventional cycloid speed reducer as shown in FIG. 1.
Figure 3:
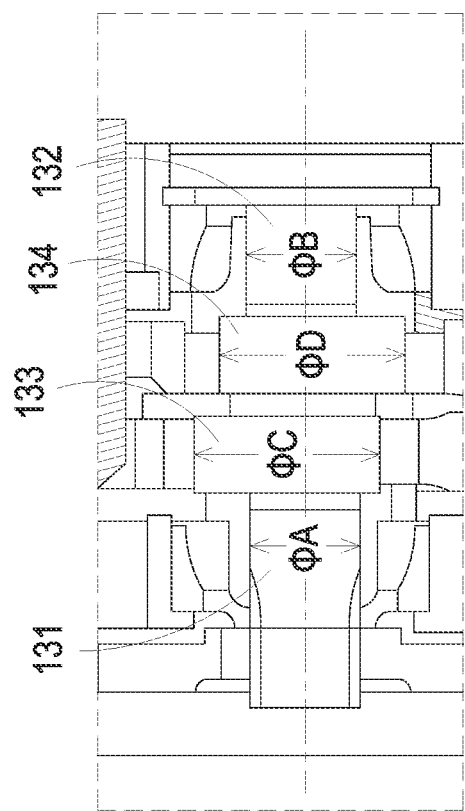
FIG. 3 is a schematic cross-sectional view showing a portion of the crankshaft in the conventional cycloid speed reducer as shown in FIG. 1.
Figure 4:
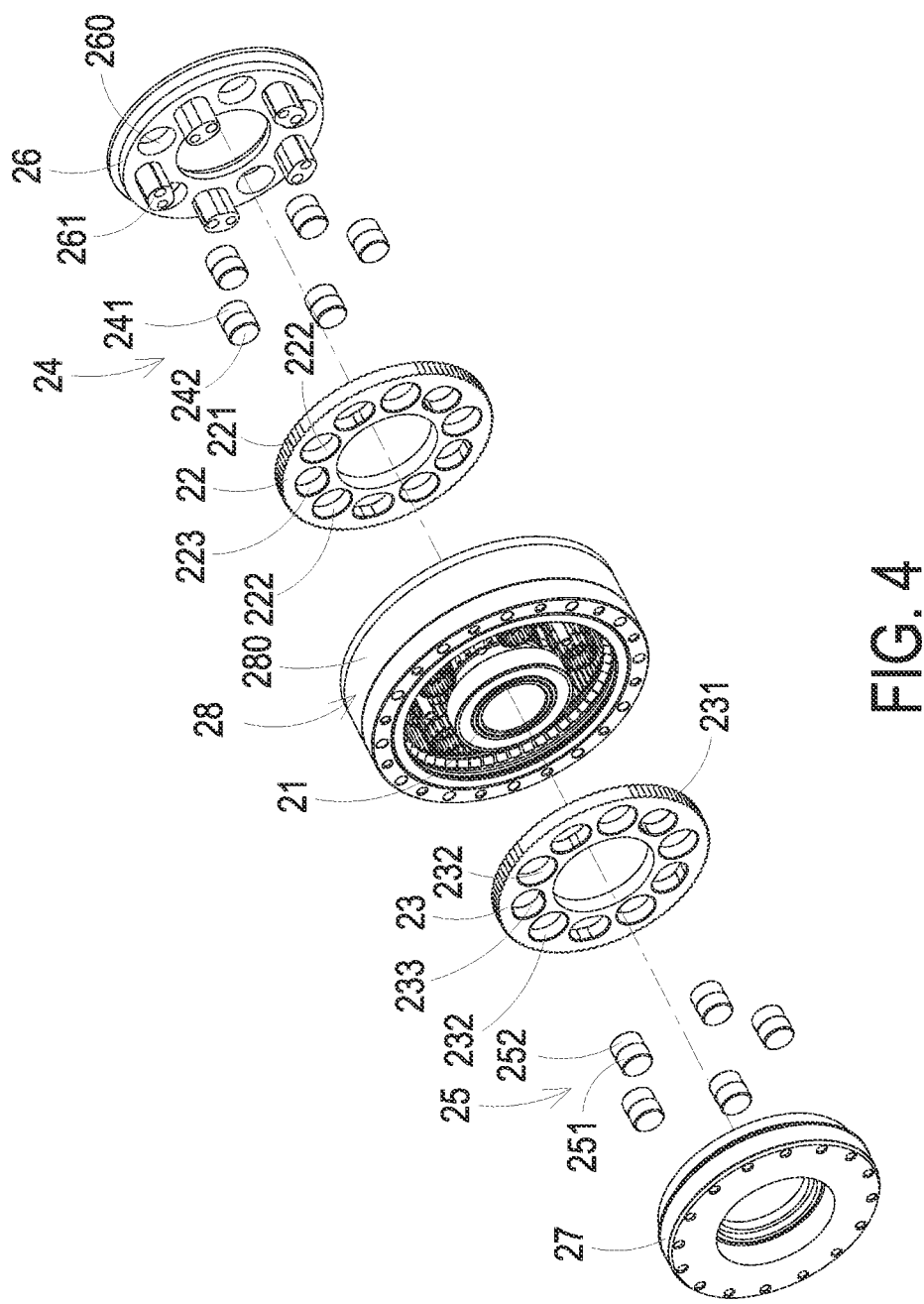
FIG. 4 is a schematic exploded view illustrating a cycloid speed reducer according to an embodiment of the present invention and taken along a viewpoint.
Figure 5:
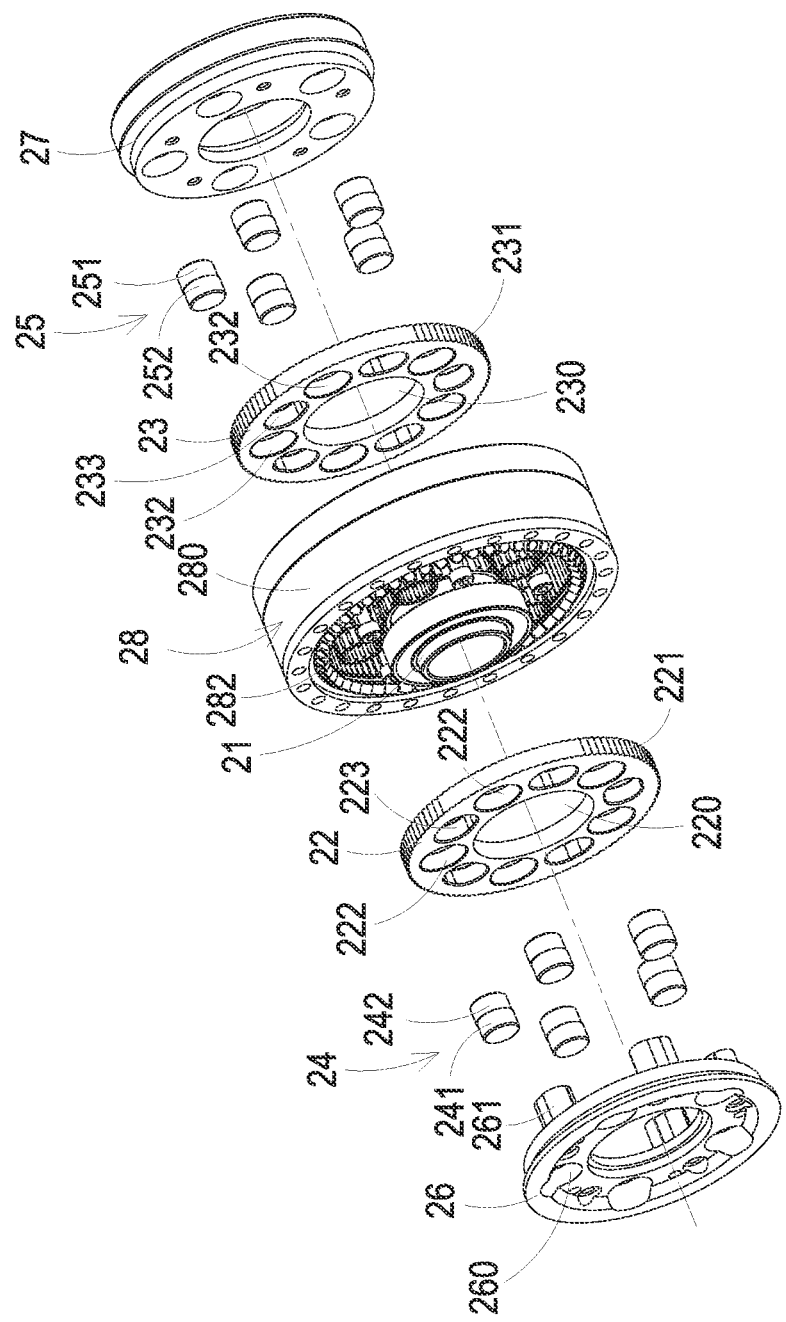
FIG. 5 is a schematic exploded view illustrating the cycloid speed reducer as shown FIG. 4 and taken along another viewpoint.
Figure 6:
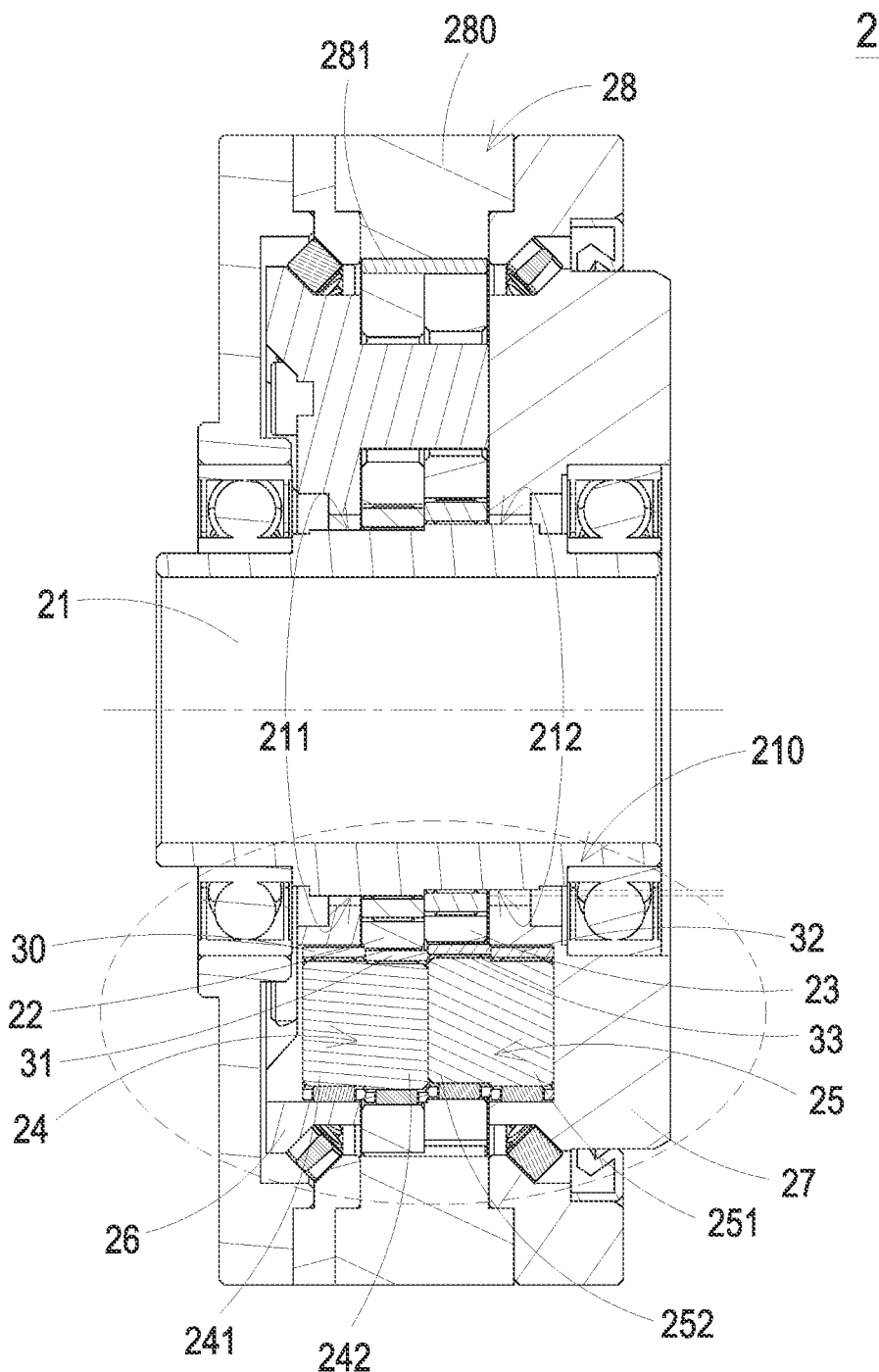
FIG. 6 is a schematic cross-sectional view illustrating the cycloid speed reducer as shown FIG. 4.
Figure 7:
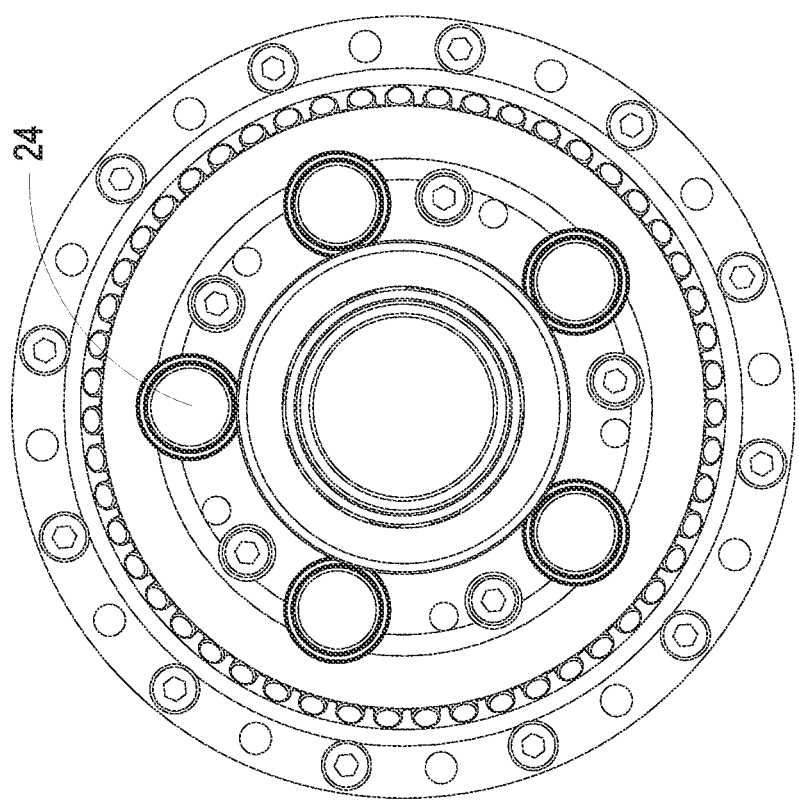
FIG. 7 is a schematic side view illustrating the cycloid speed reducer as shown FIG. 4.
Figure 8:
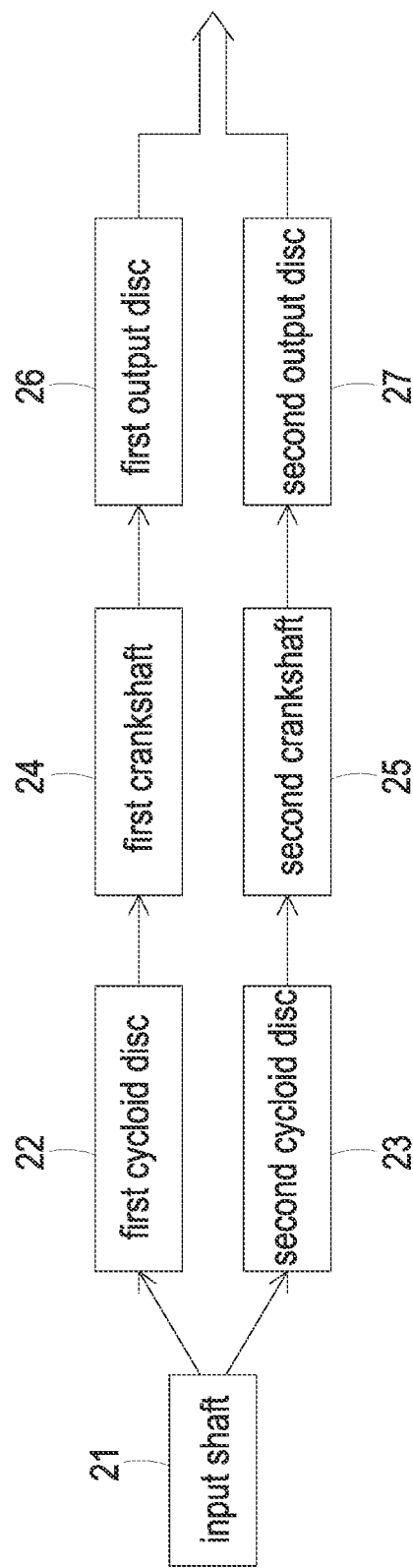
FIG. 8 is a schematic functional block diagram illustrating a power transmission mechanism in the cycloid speed reducer as shown in FIG. 4.
Figure 9:
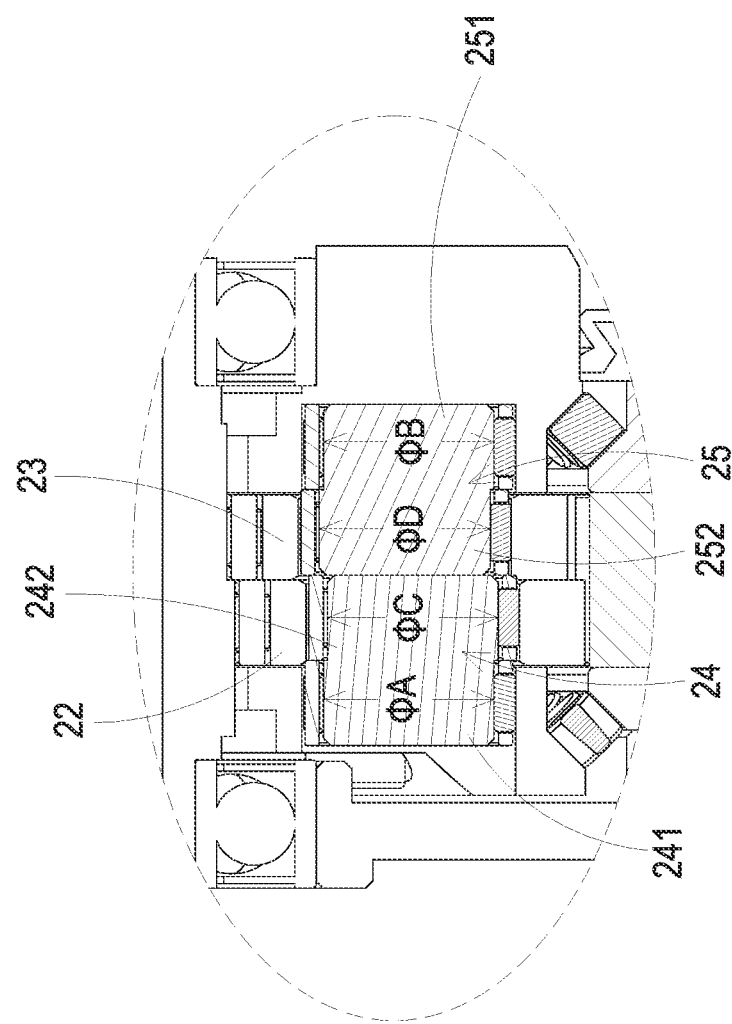
FIG. 9 is a schematic cross-sectional view showing portions of a first crankshaft and a second crankshaft of the cycloid speed reducer as shown in FIG. 4.
Figure 10:
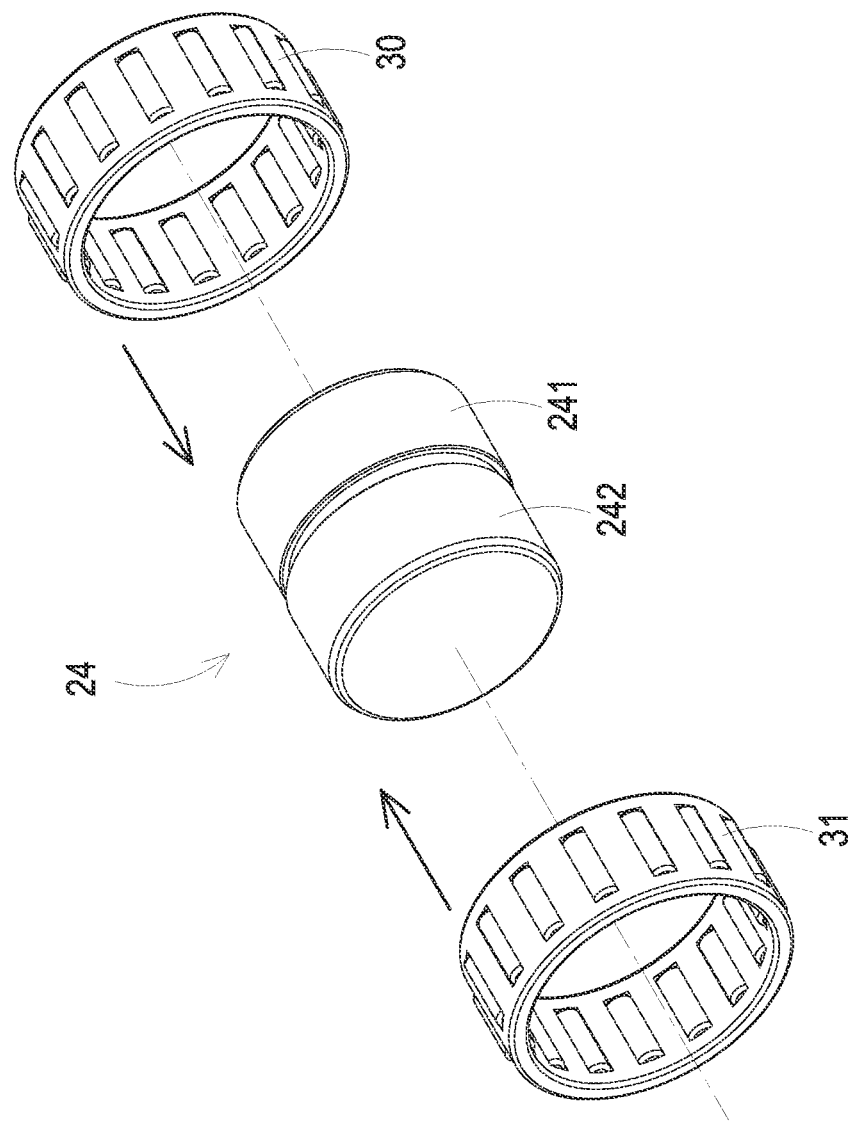
FIG. 10 schematically illustrates the relationship between the first crankshaft, the first bearing and the second bearing of the cycloid speed reducer as shown in FIG. 4.
Figure 11:
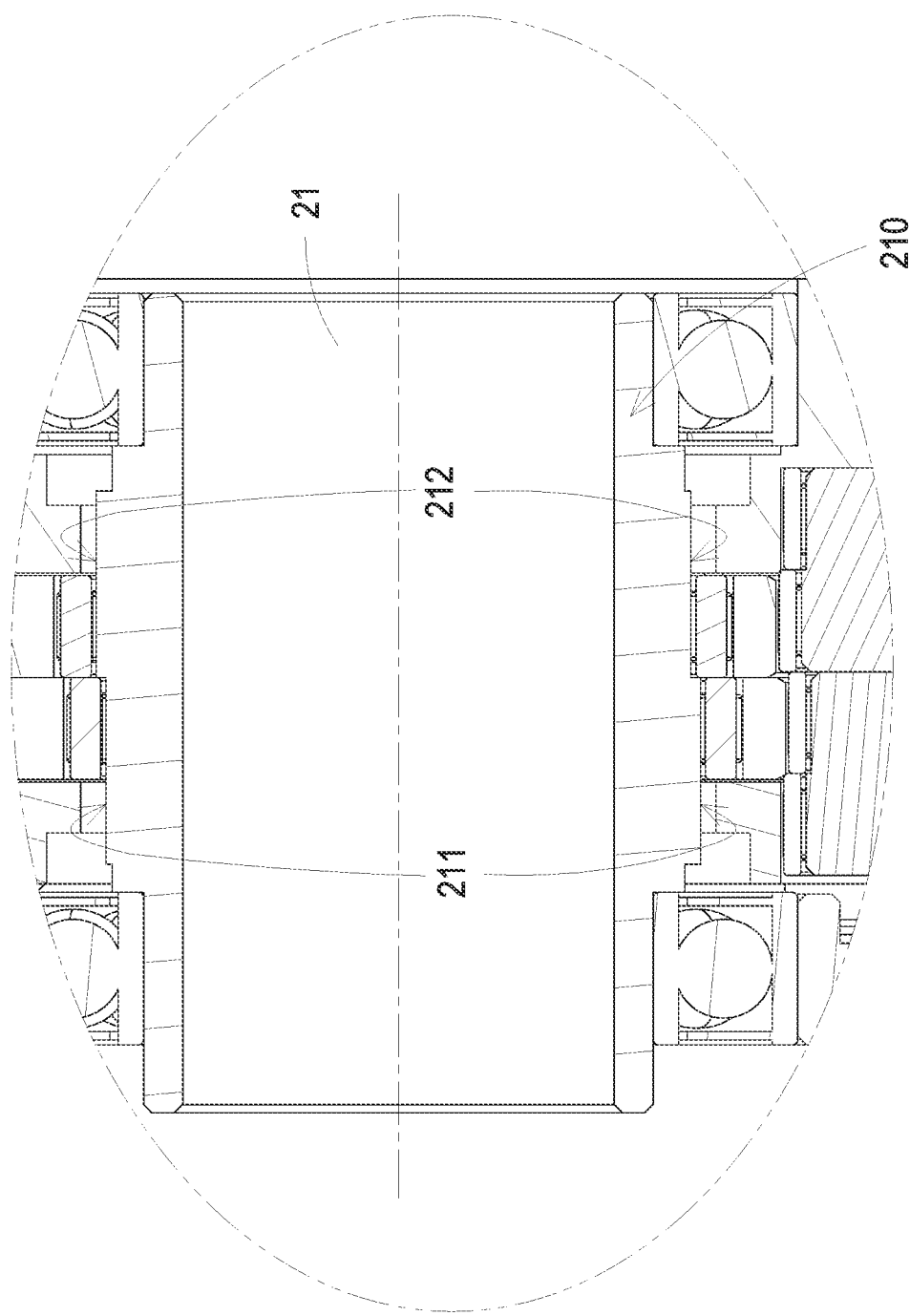
FIG. 11 is an enlarged fragmentary view of an eccentric assembly of the cycloid speed reducer as shown in FIG. 4.

Please refer to FIGS. 4, 5, 6, 7, 8, 9, 10 and 11. FIG. 4 is a schematic exploded view illustrating a cycloid speed reducer according to an embodiment of the present invention and taken along a viewpoint. FIG. 5 is a schematic exploded view illustrating the cycloid speed reducer as shown FIG. 4 and taken along another viewpoint. FIG. 6 is a schematic cross-sectional view illustrating the cycloid speed reducer as shown FIG. 4. FIG. 7 is a schematic side view illustrating the cycloid speed reducer as shown FIG. 4. FIG. 8 is a schematic functional block diagram illustrating a power transmission mechanism in the cycloid speed reducer as shown in FIG. 4. FIG. 9 is a schematic cross-sectional view showing portions of a first crankshaft and a second crankshaft of the cycloid speed reducer as shown in FIG. 4. FIG. 10 schematically illustrates the relationship between the first crankshaft, the first bearing and the second bearing of the cycloid speed reducer as shown in FIG. 4. FIG. 11 is an enlarged fragmentary view of an eccentric assembly of the cycloid speed reducer as shown in FIG. 4. As shown in FIGS. 4 to 11, the cycloid speed reducer 2 is applied to motors, machine tools, robotic arms, automobiles, motorcycles or other motive machines in order to provide a speed reducing function.

The cycloid speed reducer 2 includes an input shaft 21, a first cycloid disc 22, a second cycloid disc 23, at least one first crankshaft 24, at least one second crankshaft 25, a first output disc 26, a second output disc 27 and a rolling assembly 28.

The rolling assembly 28 includes a ring-shaped structure 280 and a plurality of rolling pins 281 (see FIG. 6). The center position of the ring-shaped structure 280 includes an axial hole (not shown). A portion of the input shaft 21 is penetrated through the axial hole of the ring-shaped structure 280. The rolling assembly 28 and the ring-shaped structure 280 are fixed. The plurality of rolling pins 281 are disposed on the ring-shaped 280.

The input shaft 21 receives an input power from a motor (not shown). In response to the input power, the input shaft 21 is driven to rotate. The input shaft 21 is substantially located at the center position of the cycloid speed reducer 2.

The first cycloid disc 22 includes an axial hole 220 and a plurality of first teeth 221. The axial hole 220 is located at the center position of the first cycloid disc 22 and aligned with the installation position of the input shaft 21. A portion of the input shaft 21 is penetrated through the axial hole 220 of the first cycloid disc 22, and thus the first cycloid disc 22 is disposed around the input shaft 21. As the input shaft 21 is rotated, the first cycloid disc 22 is driven by the input shaft 21 and rotated. The plurality of the first teeth 221 are protruded from an outer periphery of the first cycloid disc 22. In addition, the at least one first tooth 221 is contacted with the corresponding rolling pin 281.

The second cycloid disc 23 includes an axial hole 230 and a plurality of second teeth 231. The axial hole 230 is located at the center position of the second cycloid disc 23 and aligned with the installation position of the input shaft 21. A portion of the input shaft 21 is penetrated through the axial hole 230 of the second cycloid disc 23, and thus the second cycloid disc 23 is disposed around the input shaft 21. As the input shaft 21 is rotated, the second cycloid disc 23 is driven by the input shaft 21 and rotated. The plurality of second teeth 231 are protruded from an outer periphery of the second cycloid disc 23. In addition, at least one second tooth 231 is contacted with the corresponding rolling pin 281.

The at least one first crankshaft 24 and the corresponding second crankshaft 25 are coaxially arranged. The installation position of the at least one first crankshaft 24 corresponds to the installation position of the at least one second crankshaft 25. The number of the at least one first crankshaft 24 and the number of the at least one second crankshaft 25 are equal. For example, the at least one first crankshaft 24 includes five first crankshafts 24, and the at least one second crankshaft 25 includes five second crankshaft 25. Each first crankshaft 24 is arranged beside the corresponding second crankshaft 25. Moreover, each first crankshaft 24 and the corresponding second crankshaft 25 are two separate components. Since the first crankshaft 24 and the corresponding second crankshaft 25 are not integrally formed as a one-piece structure, there is no direct linkage between the first crankshaft 24 and the corresponding second crankshaft 25.

The first crankshaft 24 includes a first concentric end 241 and a first eccentric end 242. The second crankshaft 25 includes a second concentric end 251 and a second eccentric end 252. In the first crankshaft 24, the axis of the first eccentric end 242 is eccentric relative to the axis of the first concentric end 241. In the second crankshaft 25, the axis of the second eccentric end 252 is eccentric relative to the axis of the second concentric end 252. In other words, each of the first crankshaft 24 and the second crankshaft 25 is a single eccentric structure. The first eccentric end 242 of the first crankshaft 24 is linked with the first cycloid disc 22. The first concentric end 241 of the first crankshaft 24 is linked with the first output disc 26. The second eccentric end 252 of the second crankshaft 25 is linked with the second cycloid disc 23. The second concentric end 251 of the second crankshaft 25 is linked with the second output disc 27. When the first cycloid disc 22 and the second cycloid disc 23 are driven by the input shaft 21 and rotated, the first cycloid disc 22 drives the rotation of the first crankshaft 24 through the linkage between the second eccentric end 242 of the first crankshaft 24 and the first cycloid disc 22, and the second cycloid disc 23 drives the rotation of the second crankshaft 25 through the linkage between the second eccentric end 252 of the second crankshaft 25 and the second cycloid disc 23. Consequently, the first concentric end 241 of the first crankshaft 24 and the second concentric end 251 of the second crankshaft 25 are synchronously rotated to drive the respective rotations of the first output disc 26 and the second output disc 27.

The first output disc 26 and the second output disc 27 are located at two opposite outer sides of the cycloid speed reducer 2, respectively. At least one of the first output disc 26 and the second output disc 27 is served as a power output end of the cycloid speed reducer 2 in order to output the power.

Please refer to FIG. 6 again. The cycloid speed reducer 2 further includes at least one first bearing 30, at least one second bearing 31, at least one third bearing 32 and at least one fourth bearing 33. The first bearing 30 is disposed around the first concentric end 241 of the first crankshaft 24. The second bearing 31 is disposed around the first eccentric end 242 of the first crankshaft 24. The third bearing 32 is disposed around the second concentric end 251 of the second crankshaft 25. The fourth bearing 33 is disposed around the second eccentric end 252 of the second crankshaft 25.

From the above descriptions, the cycloid speed reducer 2 has a one-stage reduction ratio architecture with two cycloid discs. Consequently, the cycloid speed reducer 2 has the advantages of achieving even power output and dynamic balance. Moreover, the power transmission method of the cycloid speed reducer 2 of the present invention is different from that of the conventional cycloid speed reducer. That is, the cycloid speed reducer 2 of the present invention is not equipped with the spur gear. In addition, the cycloid speed reducer 2 of the present invention uses crankshafts (i.e., the first crankshaft 24 and the second crankshaft 25), and each crankshaft has a single eccentric structure. Consequently, when the first bearing 30 and the second bearing 31 are disposed on the first crankshaft 24, the first bearing 30 is sleeved on the first crankshaft 24 by installing the first bearing 30 through the first concentric end 241, and the second bearing 31 is sleeved on the first crankshaft 24 by installing the second bearing 31 through the first eccentric end 242 (see FIG. 10). Similarly, when the third bearing 32 and the fourth bearing 33 are disposed on the second crankshaft 25, the third bearing 32 is sleeved on the second crankshaft 25 by installing the third bearing 32 through the second concentric end 251, and the fourth bearing 33 is sleeved on the second crankshaft 25 by installing the fourth bearing 33 through the second eccentric end 252. Alternatively, the first bearing 30 and the second bearing 31 are disposed around the first crankshaft 24 through the same end of the first crankshaft 24 (e.g., the first concentric end 241 or the first eccentric end 242), and the third bearing 32 and the fourth bearing 33 are disposed around the second crankshaft 25 through the same end of the second crankshaft 25 (e.g., the second concentric end 251 or the second eccentric end 252). Consequently, the limitations on the bearing assembly process for the cycloid speed reducer 2 will be eliminated. Due to this design, the external diameter of the first eccentric end 242 of the first crankshaft 24 is equal to the external diameter of the first concentric end 241 of the first crankshaft 24, and the external diameter of the second eccentric end 252 of the second crankshaft 25 is equal to the external diameter of the second concentric end 251 of the second crankshaft 25. That is, it is not necessary to increase the external diameter of the first eccentric end 242 of the first crankshaft 24 and the external diameter of the second eccentric end 252 of the second crankshaft 25. Consequently, the size of the cycloid speed reducer 2 of the present invention is reduced, and the cycloid speed reducer 2 is suitable for miniaturization. As mentioned above, the external diameter of the first eccentric end 242 of the first crankshaft 24 is equal to the external diameter of the first concentric end 241 of the first crankshaft 24, and the external diameter of the second eccentric end 252 of the second crankshaft 25 is equal to the external diameter of the second concentric end 251 of the second crankshaft 25. Consequently, the first bearing 30 and the second bearing 31 disposed around the first concentric end 241 and the first eccentric end 242 of the first crankshaft 24 may be designed to comply with the same specification, and the third bearing 32 and the fourth bearing 33 disposed around the second concentric end 251 and the second eccentric end 252 of the second crankshaft 25 may be designed to comply with the same specification. In this way, the component cost is reduced. Moreover, since each of the first crankshaft 24 and the second crankshaft 25 has the single eccentric structure, there is no processing requirement on the phase difference. Since the processing operation is relatively simple, the processing cost of the cycloid speed reducer 2 of the present invention is reduced.

Please refer to FIG. 9. The external diameter DA of the first concentric end 241 of the first crankshaft 24 is equal to the external diameter $\Phi DC$ of the first eccentric end 242 of the first crankshaft 24, and/or the external diameter $\Phi B$ of the second concentric end 251 of the second crankshaft 25 is equal to the external diameter $\Phi D$ of the second eccentric end 252 of the second crankshaft 25. In case that the load applied to the first crankshaft 24 and the load applied to the second crankshaft 25 are different, the external diameter $\Phi A$ of the first concentric end 241 of the first crankshaft 24 and the external diameter $\Phi B$ of the second concentric end 251 of the second crankshaft 25 are different. As the load is larger, the external diameter of the eccentric end of the crankshaft can be larger. In case that the load applied to the first crankshaft 24 and the load applied to the second crankshaft 25 are equal, the external diameter $\Phi A$ of the first concentric end 241 of the first crankshaft 24 and the external diameter $\Phi B$ of the second concentric end 251 of the second crankshaft 25 are equal.

In an embodiment, the first cycloid disc 22 further includes at least one first installation hole 222. The at least one first installation hole 222 is aligned with the corresponding first crankshaft 24 for allowing the first eccentric end 242 of the corresponding first crankshaft 24 to penetrate through. Consequently, the first eccentric end 242 of the corresponding first crankshaft 24 and the first cycloid disc 22 are linked with each other. Similarly, the first output disc 26 further includes at least one second installation hole 260. The at least one second installation hole 260 is aligned with the corresponding first crankshaft 24 for allowing the first concentric end 241 of the corresponding first crankshaft 24 to penetrate through. Consequently, the first concentric end 241 of the corresponding first crankshaft 24 and the first output disc 26 are linked with each other. Similarly, the second cycloid disc 23 further includes at least one third installation hole 232. The at least one third installation hole 232 is aligned with the corresponding second crankshaft 25 for allowing the second eccentric end 252 of the corresponding second crankshaft 25 to penetrate through. Consequently, the second eccentric end 252 of the corresponding second crankshaft 25 and the second cycloid disc 23 are linked with each other. Similarly, the second output disc 27 further includes at least one fourth installation hole 270. The at least one fourth installation hole 270 is aligned with the corresponding second crankshaft 25 for allowing the second concentric end 251 of the corresponding second crankshaft 25 to penetrate through. Consequently, the second concentric end 251 of the corresponding second crankshaft 25 and the second output disc 27 are linked with each other.

In some embodiments, at least one of the first output disc 26 and the second output disc 27 includes at least one connecting post. For example, in the embodiment as shown in FIGS. 4 and 5, the first output disc 26 includes at least one connecting post 261. A first end of the connecting post 261 is disposed on a wall surface of the first output disc 26. A second end of the connecting post 261 is extended in the direction toward the second output disc 27. Moreover, the first cycloid disc 22 further includes at least one first opening 223. The rolling assembly 28 further includes at least one second opening 282. The second cycloid disc 23 further includes at least one third opening 233. The at least one first opening 223 of the first cycloid disc 22 is aligned with the corresponding connecting post 261. The at least one second opening 282 of the rolling assembly 28 is formed in the ring-shaped structure 280 and aligned with the corresponding connecting post 261. The at least one third opening 233 of the second cycloid disc 23 is aligned with the corresponding connecting post 261. The size of each of the openings 223, 282 and 233 is greater than the size of the corresponding connecting post 261. When the first cycloid disc 22, the rolling assembly 28 and the second cycloid disc 23 are assembled with each other, the at least one connecting post 261 is penetrated through the corresponding openings 223, 282 and 233, and fixedly connected with the second output disc 27. For example, the at least one connecting post 261 is fixedly connected with the second output disc 27 in a screwing manner. Especially, the at least one connecting post 261 is not contacted with the first cycloid disc 22, the rolling assembly 28 and the second cycloid disc 23. Since the first end of the connecting post 261 is fixedly connected with the first output disc 26 and the second end of the connecting post 261 is fixedly connected with the second output disc 27, the first output disc 26 and the second output disc 27 are linked with each other. Since the output power from the first output disc 26 is generated by the first output disc 26 and the second output disc 27 collaboratively or the output power from the second output disc 27 is generated by the first output disc 26 and the second output disc 27 collaboratively, the first output disc 26 or the second output disc 27 is served as the power output end of the cycloid speed reducer 2 to output the power.

Hereinafter, the power transmission method of the cycloid speed reducer 2 of the present invention will be described with reference to FIG. 8. Firstly, as the input shaft 21 is rotated, the input shaft 21 drives the rotations of the first cycloid disc 22 and the second cycloid disc 23. Since the first cycloid disc 22 is linked with the first eccentric end 242 of the first crankshaft 24 and the second cycloid disc 23 is linked with the second eccentric end 252 of the second crankshaft 25, the first cycloid disc 22 and the second cycloid disc 23 drive the respective rotations of the first crankshaft 24 and the second crankshaft 25. Consequently, the first concentric end 241 of the first crankshaft 24 and the second concentric end 251 of the second crankshaft 25 are synchronously rotated to drive the respective rotations of the first output disc 26 and the second output disc 27. The first output disc 26 and/or the second output disc 27 is served as the power output end of the cycloid speed reducer 2. In some other embodiment, the first output disc 26 and the second output disc 27 is fixed, and the ring-shaped structure 280 is served as the power output end of the cycloid speed reducer 2.

In accordance with the present invention, the reduction ratio of the cycloid speed reducer 2 is determined according to the number relationship between the plurality of first teeth 221 of the first cycloid disc 22, the plurality of second teeth 231 of the second cycloid disc 23 and the rolling pins 281 of the rolling assembly 28. The technologies of determining the reduction ratio of the cycloid speed reducer according to the number relationship between the corresponding components are well known to those skilled in the art, and not redundantly described herein.

Please refer to FIGS. 6 and 11 again. In some embodiments, the cycloid speed reducer 2 further include an eccentric assembly 210 in order to increase the swinging balance during the operation of the cycloid speed reducer 2. The eccentric assembly 210 is eccentrically fixed on the input shaft 21. The eccentric assembly 210 includes a first eccentric column 211 and a second eccentric column 212. The first eccentric column 211 and the second eccentric column 212 are eccentrically disposed on the input shaft 21 and arranged beside each other. The first cycloid disc 22 is disposed around the first eccentric column 211. The second cycloidal disc 23 is disposed around the second eccentric column 212. The eccentric direction of the first eccentric column 211 and the eccentric direction of the second eccentric column 212 are opposed to each other. Consequently, during the operation of the cycloid speed reducer 2, the swing balance between the first cycloid disc 22 and the second cycloid disc 23 is achieved through the first eccentric column 211 and the second eccentric column 212 of the eccentric assembly 210. As mentioned above, the first crankshaft 24 and the second crankshaft 25 are linked to the input shaft 21 through the first cycloid disc 22 and the second cycloid disc 23, respectively. Consequently, by adjusting the phase angle difference between the first eccentric column 211 and the second eccentric column 212, the phase angle differences between the second eccentric ends 242 of all first crankshafts 24 and the second eccentric ends 252 of all second crankshafts 25 are correspondingly adjusted.

From the above descriptions, the present invention provides a cycloid speed reducer. The cycloid speed reducer has a one-stage reduction ratio architecture with two cycloid discs. Consequently, the cycloid speed reducer has the advantages of achieving even power output and dynamic balance. The cycloid speed reducer has two crankshafts, and each of the two crankshafts has a single eccentric structure, so that the limitations on the bearing assembly process are eliminated. Consequently, the size of the cycloid speed reducer is reduced, and the cycloid speed reducer is suitable for miniaturization. Due to this design, the external diameter of the first eccentric end of the first crankshaft is equal to the external diameter of the first concentric end of the first crankshaft, and the external diameter of the second eccentric end of the second crankshaft is equal to the external diameter of the second concentric end of the second crankshaft. Consequently, the bearings disposed around the first concentric end and the first eccentric end of the first crankshaft may be designed to comply with the same specification, and the bearings disposed around the second concentric end and the second eccentric end of the second crankshaft may be designed to comply with the same specification. In this way, the component cost is reduced. Moreover, since each of the first crankshaft and the second crankshaft has the single eccentric structure, there is no processing requirement on the phase difference. Since the processing operation is relatively simple, the processing cost of the cycloid speed reducer of the present invention is reduced.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A cycloid speed reducer, comprising:
   an input shaft, which is rotatable;
   a rolling assembly comprising a ring-shaped structure and a plurality of rolling pins, wherein the plurality of rolling pins are disposed on the ring-shaped structure;
   a first cycloid disc disposed around the input shaft, wherein the first cycloid disc is driven by the input shaft and rotated, the first cycloid disc comprises a plurality of first teeth, and at least one of the plurality of first teeth is contacted with the corresponding rolling pin;
   a second cycloid disc disposed around the input shaft, wherein the second cycloid disc is driven by the input shaft and rotated, the second cycloid disc comprises a plurality of second teeth, and at least one of the plurality of first teeth is contacted with the corresponding rolling pin, wherein the first cycloid disc and the second cycloid disc are located at two opposite sides of the rolling assembly, respectively;
   at least one first crankshaft, wherein each first crankshaft comprises a first concentric end and a first eccentric end, wherein the first concentric end and the first eccentric end are eccentric relative to each other, and the first eccentric end is linked with the first cycloid disc;
   at least one second crankshaft, wherein each second crankshaft comprises a second concentric end and a second eccentric end, wherein the second concentric end and the second eccentric end are eccentric relative to each other, and the second eccentric end is linked with the second cycloid disc;
   a first output disc linked with the first concentric end of the first crankshaft; and
   a second output disc linked with the second concentric end of the second crankshaft, wherein the first output disc and the second output disc are respectively located at two opposite outer sides of the cycloid speed reducer, and at least one of the first output disc and the second output disc is a power output end of the cycloid speed reducer.

2. The cycloid speed reducer according to claim 1, wherein the cycloid speed reducer comprises at least one first bearing, at least one second bearing, at least one third bearing and at least one fourth bearing, wherein each first bearing is disposed around the first concentric end of the corresponding first crankshaft, each second bearing is disposed around the first eccentric end of the corresponding first crankshaft, each third bearing is disposed around the second concentric end of the corresponding second crankshaft, and each fourth bearing is disposed around the second eccentric end of the corresponding second crankshaft.

3. The cycloid speed reducer according to claim 2, wherein each first bearing is sleeved on the corresponding first crankshaft by installing the first bearing through the first concentric end of the corresponding first crankshaft, each second bearing is sleeved on the corresponding first crankshaft by installing the second bearing through the first eccentric end of the corresponding first crankshaft, each third bearing is sleeved on the corresponding second crankshaft by installing the third bearing through the second concentric end of the corresponding second crankshaft, and each fourth bearing is sleeved on the corresponding second crankshaft by installing the fourth bearing through the second eccentric end of the corresponding second crankshaft.

4. The cycloid speed reducer according to claim 1, wherein the first cycloid disc further comprises at least one first installation hole, and the at least one first installation hole is aligned with the corresponding first crankshaft for allowing the first eccentric end of the corresponding first crankshaft to penetrate through, so that the first eccentric end of the corresponding first crankshaft and the first cycloid disc are linked with each other, wherein the first output disc further comprises at least one second installation hole, and the at least one second installation hole is aligned with the corresponding first crankshaft for allowing the first concentric end of the corresponding first crankshaft to penetrate through, so that the first concentric end of the corresponding first crankshaft and the first output disc are linked with each other, wherein the second cycloid disc further comprises at least one third installation hole, and the at least one third installation hole is aligned with the corresponding second crankshaft for allowing the second eccentric end of the corresponding second crankshaft to penetrate through, so that the second eccentric end of the corresponding second crankshaft and the second cycloid disc are linked with each other, wherein the second output disc further comprises at least one fourth installation hole, and the at least one fourth installation hole is aligned with the corresponding second crankshaft for allowing the second concentric end of the corresponding second crankshaft to penetrate through, so that the second concentric end of the corresponding second crankshaft and the second output disc are linked with each other.

5. The cycloid speed reducer according to claim 1, wherein the first output disc comprises at least one connecting post, wherein a first end of each connecting post is disposed on a wall surface of the first output disc, and a second end of each connecting post is extended in a direction toward the second output disc, wherein the first cycloid disc further comprises at least one first opening, the rolling assembly further comprises a second opening, and the second cycloid disc further comprises at least one third opening, wherein the at least one first opening of the first cycloid disc is aligned with the corresponding connecting post, the second opening of the rolling assembly is formed in the ring-shaped structure, and the at least one third opening of the second cycloid disc is aligned with the corresponding connecting post, wherein the at least one connecting post is penetrated through the corresponding first opening of the first cycloid disc, the second opening of the rolling assembly and the corresponding third of the second cycloid disc, and the at least one connecting post is connected with the second output disc, so that the first output disc and the second output disc are linked with each other.

6. The cycloid speed reducer according to claim 5, wherein each of the at least one first opening, the second opening and the at least one third opening is greater than the corresponding connecting post, wherein when the at least one connecting post is penetrated through the corresponding first opening of the first cycloid disc, the second opening of the rolling assembly and the corresponding third opening of the second cycloid disc, the at least one connecting post is not connected with the first cycloid disc, the rolling assembly and the second cycloid disc.

7. The cycloid speed reducer according to claim 1, wherein an external diameter of the first concentric end of the first crankshaft and an external diameter of the first eccentric end of the first crankshaft are equal.

8. The cycloid speed reducer according to claim 1, wherein an external diameter of the second concentric end of the second crankshaft and an external diameter of the second eccentric end of the second crankshaft are equal.

9. The cycloid speed reducer according to claim 1, wherein an external diameter of the first concentric end of the first crankshaft and an external diameter of the second concentric end of the second crankshaft are equal.

10. The cycloid speed reducer according to claim 1, wherein the input shaft further comprises at least one eccentric assembly, and the eccentric assembly is eccentrically fixed on the input shaft, wherein the eccentric assembly comprises a first eccentric column and a second eccentric column, and the first eccentric column and the second eccentric column are eccentrically disposed on the input shaft and arranged beside each other, wherein the first cycloid disc is disposed around the first eccentric column, the second cycloidal disc is disposed around the second eccentric column, and an eccentric direction of the first eccentric column and an eccentric direction of the second eccentric column are opposed to each other.

* * * * *